United States Patent [19]

Tsuruoka

[11] Patent Number: 6,047,034

[45] Date of Patent: Apr. 4, 2000

[54] DISCRIMINATING APPARATUS FOR DIGITAL AUDIO BROADCASTING

[75] Inventor: Tatsuya Tsuruoka, Kanagawa, Japan

[73] Assignee: Sony Corporation, Tokyo, Japan

[21] Appl. No.: 08/968,133

[22] Filed: Nov. 12, 1997

[30] Foreign Application Priority Data

Nov. 13, 1996 [JP] Japan .................................. 8-302067

[51] Int. Cl.[7] ................................................. H04L 27/22
[52] U.S. Cl. ............................................................ 375/343
[58] Field of Search ..................... 375/207, 208, 375/209, 210, 343, 367; 370/515

[56] References Cited

U.S. PATENT DOCUMENTS 5,233,632 8/1993 Baum et al. ............................ 375/368
5,373,507 12/1994 Skold ..................................... 375/365
5,748,686 5/1998 Langberg et al. ..................... 375/367
5,978,416 11/1999 Watanabe et al. ..................... 375/231

*Primary Examiner*—Young T. Tse
*Attorney, Agent, or Firm*—Jay H. Maioli

[57] ABSTRACT

A discriminating apparatus for digital audio broadcasting according to the present invention includes a delay means for delaying an input signal by a time corresponding to a period of an effective symbol in a symbol, a correlation means for judging whether any correlation exists or not between the input signal and a delayed signal from the delay means, a moving average means for calculating a moving average of an output of the correlation means in a period corresponding to a guard interval in the symbol, and a comparing means for comparing an output of the moving average means with a threshold level. It is determined based on an output of the comparing means whether or not the input signal is a digital audio broadcasting signal.

2 Claims, 4 Drawing Sheets

FIG. 2
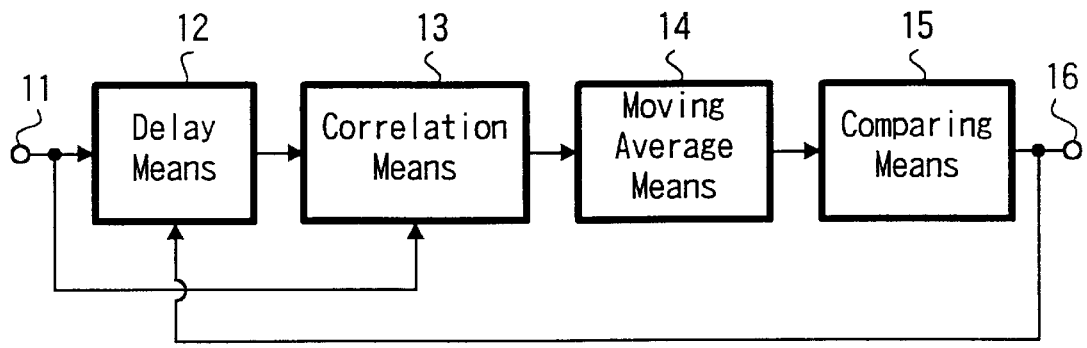
FIG. 3
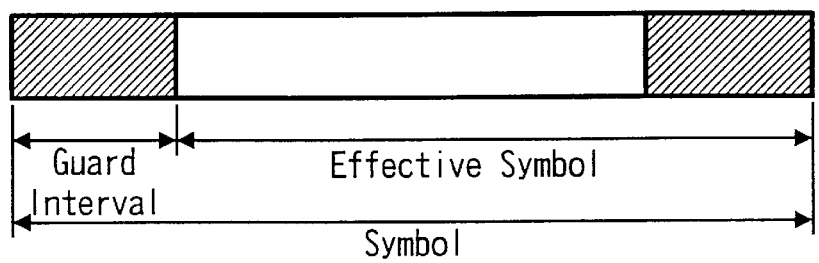
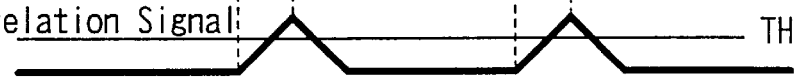

FIG. 5A  Original Signal
FIG. 5B  Delayed Signal
FIG. 5C  Correlation Signal
FIG. 5D  Moving Average Signal of Correlation Signal
——————————————— TH
FIG. 6
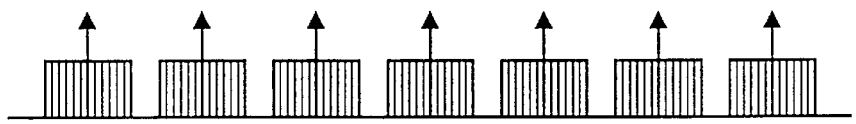

DISCRIMINATING APPARATUS FOR DIGITAL AUDIO BROADCASTING

BACKGROUND OF THE INVENTION

1. Field of the Invention

The present invention relates to a discriminating apparatus for a digital audio broadcasting suitable for application to a receiver for a broadcasting system called a digital audio broadcasting (DAB) established in Europe.

2. Description of the Related Art

As shown in FIG. 6, a digital audio broadcasting, by varying its frequency, is positioned on a plurality of frequency allocations which are arranged at an equal frequency interval. However, the digital audio broadcasting is not always on all of the frequency allocations, but there is such a case where a television broadcasting may be on a part of the frequency allocations. Therefore, it is necessary to determine whether or not there exists a television broadcasting on a certain frequency allocation.

In the above example, under the assumption that a digital audio broadcasting exists on a certain frequency allocation and a received signal is decoded by the synchronization of the DAB signal, it is discriminated whether or not the digital audio broadcasting exists by whether an audio signal can be obtained or not.

It takes several to some 10 frames (a little less than 1 second) to synchronize the DAB signal, and therefore it takes much time to discriminate whether a digital audio broadcasting exists or not on every frequency allocation. This is not practical.

SUMMARY OF THE INVENTION

In consideration of such an aspect, the present; invention is intended to propose a discriminating apparatus of digital audio broadcasting for discriminating easily and quickly whether a broadcasting on a certain frequency allocation is digital audio broadcasting or not.

The present invention is a discriminating apparatus of digital audio broadcasting comprising a delay means for delaying an input signal by the time τ/n (where n=1, 2, 4, 8, . . . and τ is a predetermined time) corresponding to the period of an effective symbol in a symbol; a correlation means for judging whether any correlation exists or not between the input signal and a delayed signal from the delay means; a moving average means for calculating the moving average of the output from said correlation means by the period corresponding to the guard interval in the symbol; and a comparing means for comparing the output from said moving average means with a threshold level; wherein it is judged whether the input signal is a digital audio broadcasting signal or not by the output of the comparing means.

According to such a present invention, a delay means delays an input signal by the time τ/n corresponding to the period of the effective symbol in the symbol and a correlation means judges whether any correlation exists or not between the input signal and the delayed signal from the delay means. Further, a moving average means calculates the moving average of the output from the correlation means by the period corresponding to the guard interval in the symbol and a comparing means compares the output from the moving average means with a threshold level, and then it is discriminated whether digital audio broadcasting signal exists or not by the compared output thereof.

BRIEF DESCRIPTION OF THE DRAWINGS

FIG. 2 is a block diagram showing a main part of a synchronization processing circuit of the DAB receiver shown in FIG. 1;

FIG. 3 is a diagram showing a symbol of a DAB signal;

FIGS. 4A–4D are timing charts used to explain an operation of the DAB receiver according to the embodiment shown in FIG. 1;

FIGS. 5A–5D are timing charts used to explain the operation of the DAB receiver according to the embodiment shown in FIG. 1;

FIG. 6 is a diagram showing a frequency allocation; and

DESCRIPTION OF THE PREFERRED EMBODIMENT

An embodiment of the present invention will be described below in detail. Firstly, referring to FIG. 3, a symbol used in a DAB signal (digital audio broadcasting signal) is described. The symbol consists of a guard interval of a former half and an effective symbol of a latter half. An end portion of the effective symbol, as shown by hatching in FIG. 3, includes the same signal portion as that of the guard interval and having the same continuation time as that of the guard interval. Anyway, the DAB signal will be described in detail later on.

Figure 1:
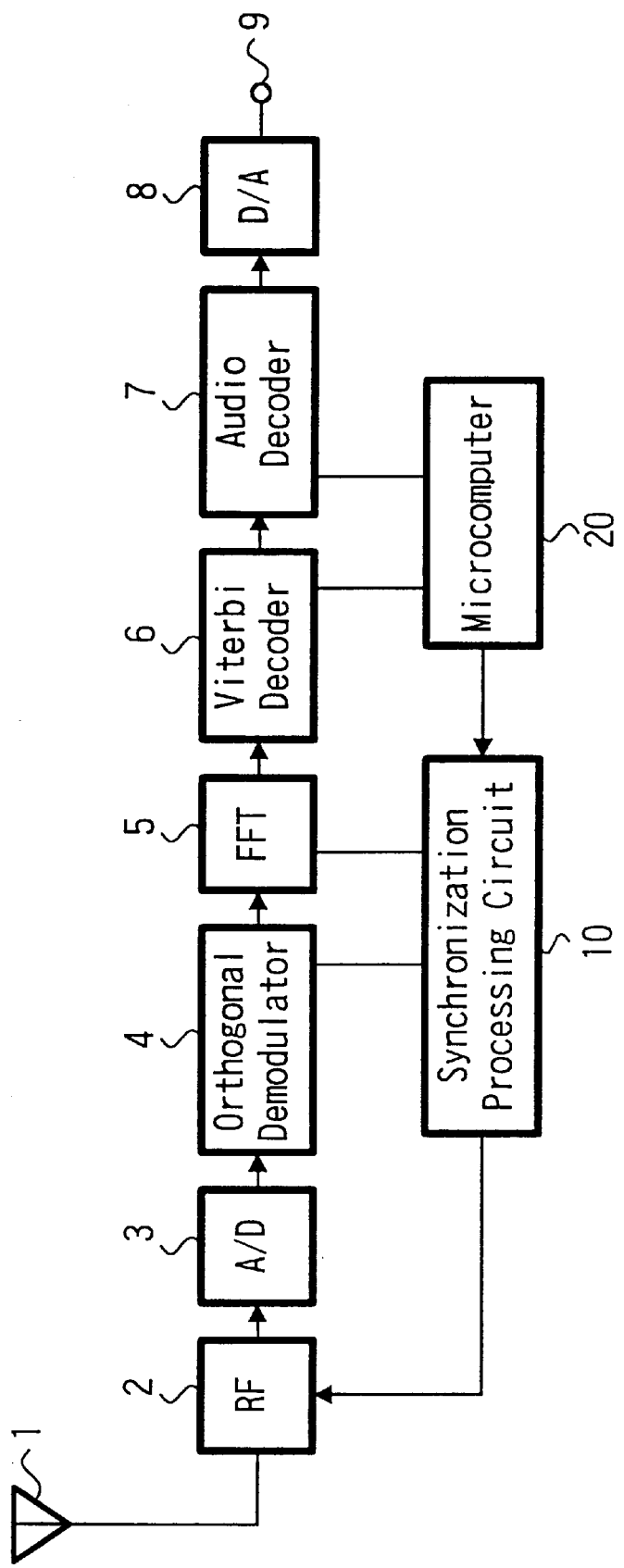
FIG. 1 is a block diagram showing a DAB receiver according to an embodiment of the present invention.

The DAB receiver according to the embodiment of the present invention has an arrangement shown in FIG. 1. Specifically, an input signal of a DAB broadcasting wave is received by an antenna 1. This input signal is supplied from the antenna 1 to a front end circuit 2 arranged in a superheterodyne system, and the front end circuit 2 converts this supplied input signal into an intermediate frequency signal and supplies the intermediate frequency signal to an A/D converter circuit 3 which converts the supplied signal into a digital signal.

The digital signal is supplied from the A/D converter 3 to an orthogonal demodulator 4, and the orthogonal demodulator 4 demodulates a baseband data and supplies the demodulated data to a fast Fourier transform (FFT) circuit 5. The FFT circuit 5 subjects the data to an orthogonal frequency division multiplex (OFDM) demodulation and supplies the OFDM-demodulated data to a Viterbi decoder 6. The Viterbi decoder 6 subjects the data to deinterleaving processing and error correction.

At this time, a system control microcomputer 20 supplies a predetermined selection signal to the Viterbi decoder 6, thereby a channel selection (program selection) being carried out. Then, a digital audio data of a target channel is selected and then supplied to an audio decoder 7. The audio decoder 7 expands data in accordance with an MPEG standard.

Thus, the decoder 7 converts the digital audio data of a target channel into an original data by data expansion and output the original digital audio data to a D/A converter 8. The D/A converter 8 converts the digital audio data into an analog audio signal and then supplies the analog audio signal to a terminal 9.

Further, the Viterbi decoder 6 supplies a part of data to the microcomputer 20. A synchronization processing circuit 10 is formed of a circuit including a DSP and carries out an automatic frequency control (AFC) of the front-end. circuit 2 and also processing for establishing synchronization in the FFT circuit 5.

A main part of the synchronization processing circuit 10 of the receiver having the above arrangement is arranged as shown in FIG. 2 which is a block diagram thereof. The orthogonal demodulator 4 supplies an original signal (a DAB signal of mode 1) shown in FIG. 4A through an input terminal 11 to a delay means 12. The delay means 12 delays it by a time $\tau/n$ {where n=1, 2, 4, 8, . . . , or n=$2^m$ (where m=0, 1, 2, 3, 4, . . . ), $\tau$ is a predetermined time, in this example n=$2^O$=1}.

The original signal from the input terminal 11 and a delayed signal (FIG. 4B) from the delay means 12 are supplied to a correlation means 13, which judges whether any correlation exists or not.

In this way, when the input signal is a DAB signal, since a signal portion, having the same continuation time as the guard interval, at the end portion of the effective symbol in the symbol of the original signal is the same as the signal of the guard interval in the symbol of the delayed signal, the correlation means 13 produces a rectangular waveform correlation signal indicating that there exists a correlation (shown in FIG. 4C).

When the correlation signal from the correlation means 13 is supplied to a moving average means 14 which calculates a moving average by the width of a time corresponding to the guard interval in the symbol, the moving average means 14 outputs a triangular waveform signal of a line symmetry in which, as shown in FIG. 4D, at the rising edge of the rectangular correlation signal indicating that there exists a correlation it begins a rising inclination and at the falling edge of the correlation signal it begins a falling inclination.

The output of the moving average means 14 is supplied to a comparing means 15, which compares it with a threshold level TH, as shown in FIG. 4D, having a level a little lower than the amplitude level of the triangular waveform signal actually obtained and, if it is higher than the threshold level TH, the comparing means 15 outputs to an output terminal 16 a discriminated signal indicating that the received input signal is a DAB signal.

However, if the input signal is not a DAB signal, the correlation signal from the correlation means 13 indicates that there is no correlation, so that the output signal from the moving average means 14 is not a triangular waveform signal and hence the output signal from the moving average means 14 is less than the threshold level. Therefore, the comparing means 15 outputs to the output terminal 16 a discrimination signal which indicates that the input signal is not a DAB signal. Then, a signal output from the output terminal 16 is supplied to a microcomputer 20.

Figure 7:
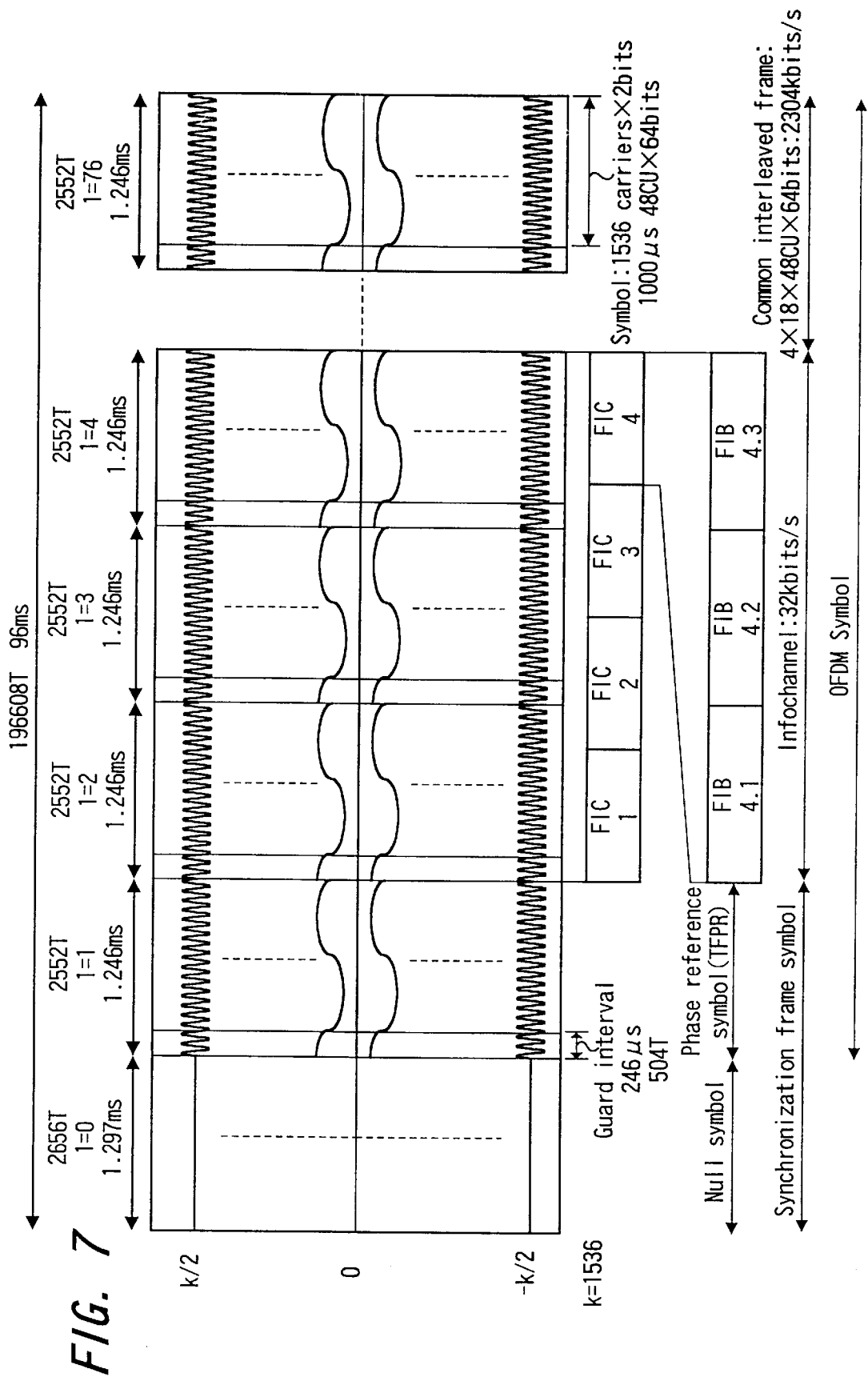
FIG. 7 is a diagram showing an arrangement of a frame of the DAB signal of mode 1.

Until now, the signals of mode 1,2,3 and 4 have been known as the DAB signal. A basic period T (=1/2048 MHz=0.48828 sec) of the DAB signal is defined. A DAB signal of mode 1 as a typical example is shown in FIG. 7. In FIG. 7, the basic period T and time are both illustrated. One frame of the DAB signal of mode 1 is 196608T (=96 msec) and consists of one null symbol (symbol number l=0) having a continuation time of 2656T (=1.297 msec) and the following 76 symbols (symbol number l=1~76), each having a continuation time of 2552T (=1.246 msec).

Each of the symbols of the symbol number l=1~76 consists of a guard interval of a continuation time of 504T (=246 $\mu$sec) in the beginning part thereof and the following effective symbol of a continuation time of 2048T (=1 msec). The effective symbol of each symbol of the symbol number l=1~76 includes multicarriers of k=1536 having different frequencies from one another. The carrier indicated by 0 is the carrier of a center frequency (the period of this carrier is T), the carrier indicated by 1536/2 (=766) is the carrier of the highest frequency, and the carrier indicated by −1536/2 (=766) is the carrier of the lowest frequency. The carrier of the lowest frequency has 1536 waves and its data amount is 1536×2 bits, 48 CU (capacity unit)×64 bits.

The whole symbol of the symbol number l=1~76 is referred to as an OFDM symbol.

The symbol of the symbol number l=1 is referred to as a phase reference symbol (Phase Reference Symbol)(TFPR: Time Frequency Reference). The whole of the symbol number l=0, 1 is referred to as a synchronization frame symbol (Synchronized Frame Symbol). The symbol number l=2~4 consists of four FICs (First Information Channels) 1~4 as a whole, each having the same continuation time. The whole of the symbol number l=2~4 is referred to as an info-channel and its data transfer rate is 32 kbits/sec. The FIC 4 consists of four FIBs (First Information Block) 4.1, 4.2, 4.3 and 4.4, each having the same continuation time.

Data from the end of the symbol number l=4 to the end of the symbol number l=76 is referred to as a common interleave frame and its data amount is 4×18×48 CU (Capacity Unit)×64 bits, its data transfer rate being 2304 kbits/sec.

Anyway, each time of the DAB signal is different depending on its mode, each time of mode 2 being ¼ of each time of mode 1, each time of mode 3 being ⅛ of each time of mode 1, and each time of mode 4 being ½ of each time of mode 1.

In other words, the continuation time of the symbol of the symbol number l=1~76 is 2552T (=1.246 msec) if mode is 1, as is described above. However, if mode is 2, it is 638T (=2552T/4) {=312 $\mu$sec (=1.246 msec/4)}, if mode is 3, it is 319T (=2552T/8) {=156 $\mu$sec (=1.246 msec/8)}, and if mode is 4, it is 1276T (=2552T/2) {=623 $\mu$sec (=1.246 msec/2)}.

Further, the continuation time $\tau/n$ of the effective symbol of the symbol number l=1~76 is 2048T (=1 msec) if mode is 1, as is described above. However, if mode is 2, it is 512T (=2048T/4) {=250 $\mu$sec (=1 msec/4)}, if mode is 3, it is 256T (=2048T/8) {=125 $\mu$sec (=1 msec/8)}, and if mode is 4, it is 1024T (=2048T/2) {=500 $\mu$sec (=1 msec/2)}.

Further, the guard interval time of the symbol number l=1~76 is 504T (=246 $\mu$sec) if mode is 1, as is described above, however, if mode is 2, it is 126T (=504T/4) {=61.5 $\mu$sec (=246 $\mu$sec/4)}, if mode is 2, it is 63T (=504T/8) {=30.75 $\mu$sec (=246 $\mu$sec/8)}, and if mode is 4, it is 252T (=504T/2) {=123 $\mu$sec (=246 $\mu$sec/2)}.

Accordingly, the delay means 12 is formed of a variable delay means to make it possible to vary the delay time $\tau/n$ (n=1, 2, 4, 8, . . . , however, in this case n=1, 2, 4 and 8) into 1 msec (mode 1), 0.5 msec (mode 4), 0.25 msec (mode 3) and 0.125 msec (mode 3).

Further, the relationship between respective symbols of the FIC and FIB varies depending on the mode.

FIG. 5 is a timing chart corresponding to FIG. 4, in a case that the input signal is a DAB signal, but the delay time by the delay means (variable delay means) 12 is not the delay time $\tau/n$ (where n=1, 2, 4 or 8) corresponding to the mode of the DAB signal. The original signal (FIG. 5A) from the input terminal 11 and the delayed signal (FIG. 5B) from the delay means 12 are supplied to the correlation means 13, which detects whether or not there exists any correlation. In this case, the correlation signal, as is shown in FIG. 5C, indicating that there exists a correlation cannot be obtained and therefore, as is shown in FIG. 5D, the signal cannot be obtained from the moving average means 14. That is, it is less than the threshold TH and the comparing means 15 determines that there is not any correlation.

Though the delay time $\tau/n$ (in this case, n=1, 2, 4 or 8) of the delay means (variable delay means) 12 is varied depending on the difference of the times $\tau/n$ corresponding to all the effective symbols of digital audio broadcasting of modes 1~4, if the comparing means 15 does not determine that there is a correlation, the input signal is determined not to be a. DAB signal. Then, the judgement output is output to the output terminal 16, while if the comparing means 15 determines that there is a correlation and the input signal is determined to be a DAB signal, the judgement output is output to the output terminal 16. If the modes increase more than the present modes 1~4 in the future, the number of the delay times τ/n increases corresponding to it.

Also, the mode of the DAB signal can be discriminated based on the fact that the comparing means 15 produces an output signal indicating that there exists a correlation at which case the delay time τ/n ( in this case n=1, 2, 4 or 8) from the delay means (variable delay means) 12 is 1 msec, 0.5 msec, 0.25 msec etc or 0.125 msec,.

According to the first embodiment of the present invention there is provided a discriminating apparatus which comprises: a delay means for delaying an input signal by a time τ/n (where n=1, 2, 4, 8, and τ is a predetermined time) corresponding to the period of an effective symbol in a symbol; a correlation means for judging whether any correlation exists or not between the input signal and a delayed signal from the delay means; a moving average means for calculating a moving average of the output of the correlation means in the period corresponding to a guard interval in the symbol; and a comparing means for comparing an output of the moving average means with a threshold level, wherein whether the input signal is a digital audio broadcasting signal or not is determined by the output signal of the comparing means, so that it can be determined easily and quickly whether a broadcasting of a certain frequency allocation is a digital audio broadcasting or not.

According to the second embodiment of the present invention there is provided a digital audio broadcasting discriminating apparatus which includes a delay means for delaying an input signal by a time τ/n (when n=1, 2, 4, 8, . . . and τ is a predetermined time) corresponding to the period of an effective symbol in a symbol, a correlation means for judging whether any correlation exists or not between the input signal and a delayed signal from the delay means; a moving average means for calculating a moving average of the output of the correlation means in the period corresponding to a guard interval in the symbol, and a comparing means for comparing an output from the moving average means with a threshold level. When it is judged that there is no correlation by an output of the comparing means, the delay means is formed of a variable delay means for sequentially varying the delay time τ/n corresponding to the effective symbol period of a digital audio broadcasting of a plurality of different modes. While the delay time τ/n corresponding to all the effective symbol periods of digital audio broadcasting of a plurality of different modes is varied, if it is not judged that there exists a correlation by an output of the comparing means which does not detect that there exists any correlation, it is judged that the input signal is not a digital audio broadcasting signal. If it is judged that there exists a correlation by the output of the comparing means, it is judged that the input signal is a digital audio broadcasting signal. Therefore, even if the times corresponding to periods of effective symbols of digital audio broadcastings are different, it can be discriminated easily and quickly whether a broadcasting of a certain frequency allocation is a digital audio broadcasting or not and the mode of digital audio broadcasting can be discriminated.

Having described a preferred embodiment of the present invention with reference to the accompanying drawings, it is to be understood that the present invention is not limited to the above-mentioned embodiment and that various changes and modifications can be effected therein by one skilled in the art without departing from the spirit or scope of the present invention as defined in the appended claims.

What is claimed is:

1. A discriminating apparatus for digital audio broadcasting, comprising:

delay means for delaying an input signal by a time τ/n (where n=1, 2, 4, 8, and . . . , τ is a predetermined time) corresponding to a first period of an effective symbol in a symbol;

correlation means for judging whether any correlation exists between said input signal and a delayed signal from said delay means;

moving average means for calculating a moving average of an output of said correlation means in a second period corresponding to a guard interval in said symbol; and comparing means for comparing an output of said moving average means with a threshold level, and supplying an output corresponding to a comparison result thereof which indicates whether said input signal is a digital audio broadcasting signal.

2. A discriminating apparatus of digital audio broadcasting, comprising:

delay means for delaying an input signal by a time τ/n (where n=1, 2, 4, 8, and τ is a predetermined time) corresponding to an effective symbol period of an effective symbol in a symbol, said delay means including variable delay means for sequentially varying said delay time τ/n corresponding to said effective symbol period of the digital audio broadcasting of a plurality of different modes;

correlation means for judging whether any correlation exists between said input signal and a delayed signal from said delay means;

moving average means for calculating a moving average of an output of said correlation means in a guard interval period corresponding to a guard interval in said symbol; and comparing means for comparing an output from said moving average means with a threshold level;

wherein when it is judged there is no correlation by an output of said comparing means, even when said delay time τ/n corresponding to all the effective symbol periods of digital audio broadcasting of said plurality of different modes is varied, it is judged that said input signal is not a digital audio broadcasting signal, and if is judged that there exists a correlation by the output of said comparing means, it is judged that said input signal is a digital audio broadcasting signal.

* * * * *